United States Patent

[11] 3,625,298

| [72] | Inventor | Laszlo Gyongyosi |
| | | 137 Grove Ave., Clarksburg, W. Va. 26301 |
| [21] | Appl. No. | 880,848 |
| [22] | Filed | Nov. 28, 1969 |
| [45] | Patented | Dec. 7, 1971 |

[54] GUIDE FOR PRESSURE HOSES
5 Claims, 2 Drawing Figs.

[52] U.S. Cl. .................................................. 173/163,
137/355.17, 173/57, 175/170, 175/216
[51] Int. Cl. .................................................... E21c 1/10
[50] Field of Search........................................ 175/85,
103, 170, 216; 173/57, 147, 152, 160, 163, 170;
137/355.12–355.28

[56] References Cited
UNITED STATES PATENTS

| 3,161,205 | 12/1964 | Merker........................ | 137/355.17 |
| 3,162,253 | 12/1964 | Curtis.......................... | 137/355.16 X |
| 3,332,434 | 7/1967 | Stahmer...................... | 137/355.17 |
| 3,467,202 | 9/1969 | Brown.......................... | 173/57 |
| 3,508,619 | 4/1970 | Huffman...................... | 173/160 X |

*Primary Examiner*—Ernest R. Purser
*Attorneys*—Carl R. Horten, David W. Tibbott and Frank H. Thomson ABSTRACT: A guide for pressure hoses for use with a machine such as a rock drill machine wherein there is a drill tower and a rotary head movable along the longitudinal axis of the drill tower. The pressure hoses are located within the drill tower in a single vertical plane and have a loop formed therein. A guide including a pair of parallel, spaced-apart guide bars is mounted within the drill tower. The bars are interconnected by a plurality of U-shaped members. The pressure hoses for supplying fluid under pressure to the rotary head fit between the parallel guide bars. As the rotary head moves up and down the tower, the loop formed in the hoses rolls between the guide bars. The guide retains the hoses within the drill tower in the designed single plane arrangements.

PATENTED DEC 7 1971

3,625,298

INVENTOR
LASZLO GYONGYOSI
BY
Frank H Thomson
ATTORNEY

GUIDE FOR PRESSURE HOSES

BACKGROUND OF THE INVENTION

This invention relates to guides for pressure hoses and in particular a pressure hose guide which is adapted to be used with rock-drilling rigs which include a drill tower and movable rotary head and a plurality of flexible pressure hoses for supplying motive fluid to the rotary head.

Conventional water well and blast hole-drilling rigs include a drill tower with a rotary head movably mounted on the drill tower. A control panel is mounted on the side of the machine. Substantially rigid standpipes are connected to the control panel and extend along the side of the drill tower. Flexible hoses extend between the standpipes and the rotary head for supplying motive fluid to the rotary head. The flexible hoses enable the rotary head to move up and down the drill tower. One problem with these flexible hoses is that unless their movement is regulated, they can get in the way of the moving rotary head or become entangled with each other.

Prior to the present invention several proposals for controlling the movement of the flexible hoses have been used. One proposal which is in use is to place the hose connections and the flexible hoses outside the drill tower to provide maximum freedom of movement for the hose under varying pressure conditions. A modification of this arrangement provides some means for holding the hoses adjacent the drill tower in the event the machine is used for angle drilling. A third method is to allow the pressure hoses to hang freely within the drill tower and a fourth method in use is to provide mechanically driven hose reels.

Each of the above arrangements has its disadvantages. If the hoses are allowed to hang freely within the drill tower, the hoses tend to become entangled with each other and hose movement is affected by wind and pressure fluctuations as well as angle-drilling operations. The hoses will tend to get in the way of the movements of the rotary head. If the hoses are placed outside of the drill tower no protection is provided for the operator in the event the hoses burst. Hose reels are subject to mechanical failures. In addition, hose reels are bulky and consume a great deal of space.

SUMMARY

It is therefore the principal object of this invention to provide a simple pressure hose guide arrangement adapted to be used with a machine which employs flexible hoses and a movable consumer of fluid under pressure.

It is a further object of this invention to provide a hose guide for use with a rock-drilling machine which is reliable for both vertical and angle drilling.

It is a still further object of this invention to provide a hose guide for pressure hoses which provides maximum safety for the operator of the machine.

It is still another object of this invention to provide a hose guide for pressure hoses which has minimum space requirements.

In general the foregoing and other objects will be carried out by providing in combination, a rock-drilling machine including a drill tower, a rotary head movably mounted on said drill tower, a control panel, a plurality of substantially rigid pipes mounted on said tower and a plurality of flexible hoses aligned in a plane parallel to the longitudinal axis of said tower and each connected to said rotary head for conducting fluid under pressure between said control panel and said rotary head whereby a loop is formed in each of said hoses between the point said hoses are connected to said pipes and the point said hoses are connected to said rotary head and said loop rolls along said tower in said plane as said rotary head moves along said tower, and guide means including means positioned on opposite sides of said loop for maintaining the alignment of said hoses.

BRIEF DESCRIPTION OF THE DRAWING

The invention will be described in connection with the annexed drawing wherein.

DESCRIPTION OF THE PREFERRED EMBODIMENT

The invention will be described as it is used on a water well and blast hole-drilling rig but it is to be understood that it may be used with other machines wherein a consumer of fluid under pressure is movably mounted on a support structure.

Figure 1:
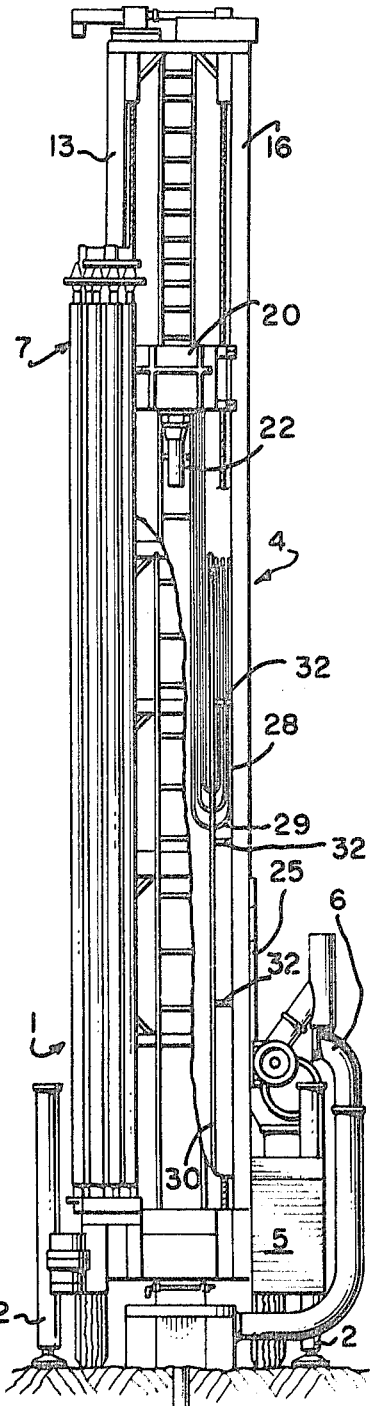
FIG. 1 is an elevational view of a rock-drilling machine employing one embodiment of the present invention.

Referring to the drawing, in FIG. 1 a rock-drilling machine is generally indicated at 1. The drilling machine includes a frame and suitable support jacks 2 for leveling the machine. The drill includes a drill tower generally indicated at 4 which is a C-shaped structure. The drilling machine includes a control panel schematically shown at 5 and a suitable dust collection apparatus 6. A carousel-type rod changing apparatus generally indicated at 7 may be provided.

Figure 2:
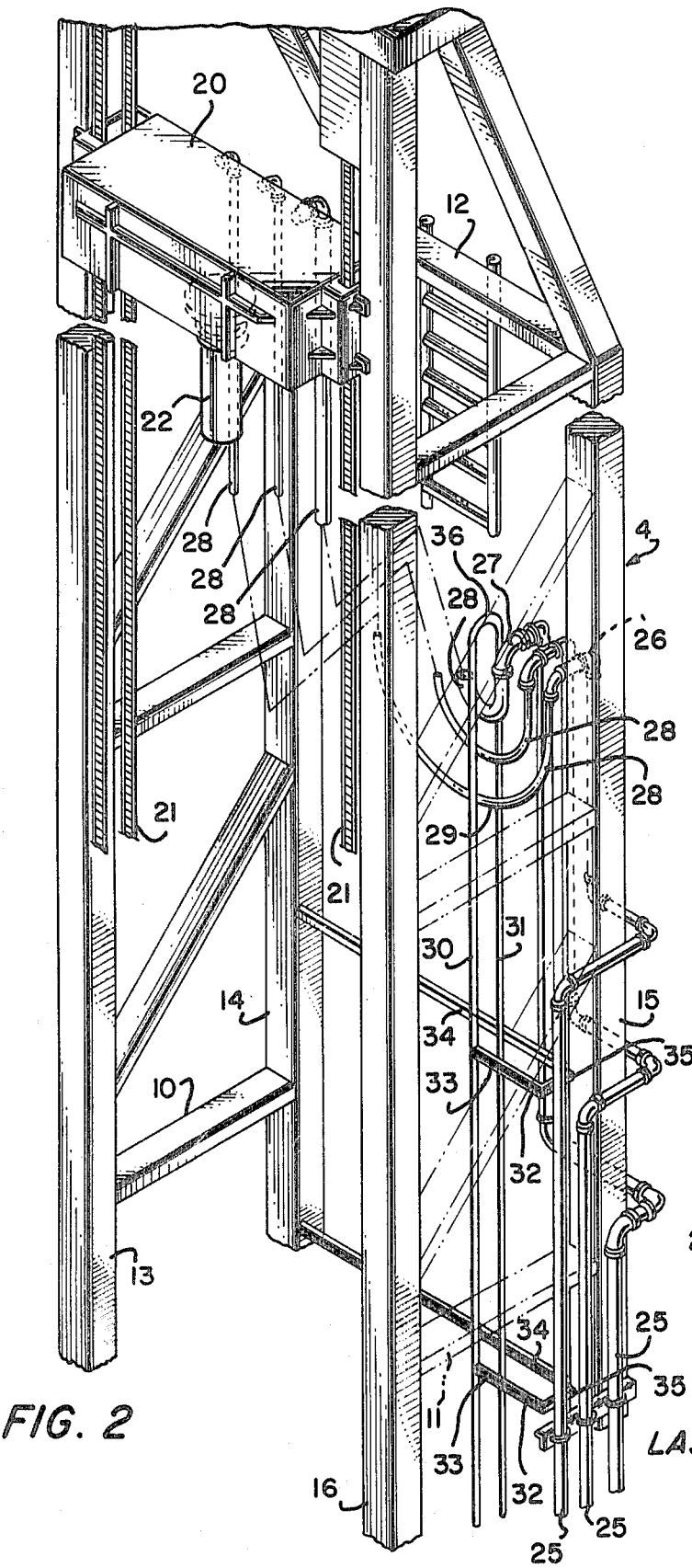
FIG. 2 is a fragmentary perspective view of a portion of the drilling machine of FIG. 1 with the rotary head in a different position.

The drill tower is best shown in FIG. 2 and includes legs 10 and 11 and a base 12 to form the C-shape of the tower. The legs 10 and 11 and base 12 of the tower are made up of suitable structural members 13, 14, 15 and 16.

A rotary head 20 is movably mounted on the drill tower and is moved along the length of the tower by any conventional means such as a chain drive including a chain 21. The rotary head 20 includes a rotary output 22 which is adapted to have a drill pipe and drill bit connected thereto.

Fluid under pressure from a suitable source (not shown) is supplied to the control panel 5. Standpipes such as those shown at 25 are mounted on the side of the drill tower as best shown in FIG. 2 and are connected at one end to the control panel 5. The other or upper end of the pipes 25 are provided with suitable elbows 26 and 27 so that the end of the pipe extends downward toward the bottom of the tower. The pipes 25 are arranged so that the elbows 27 are aligned in a single vertical plane, parallel to the base 12 of the tower. Flexible hoses 28 are connected at one end to elbows 27 of pipes 25 and at their other ends to the rotary head 20. The hose connections on the rotary head are aligned in the same vertical plane in which the elbows 27 are aligned so that the hoses 28 are aligned with each other in a single vertical plane which is parallel to the base 12 and open side of the C-shaped tower. A loop 29 is formed in the hoses 28 between the elbows 27 and the rotary head 20. The loops formed in the individual hoses are stacked as is clearly shown in FIGS. 1 and 2. Fluid under pressure is supplied from the control panel to a fluid motor in the rotary head for rotating the rotary output 22 and, in some applications, to a fluid motor which acts as a feed motor to move the rotary head up and down the drill tower.

By the present invention I have provided a guide for the pressure hoses 28 for holding the hoses in position in the drill tower. The hose guide of the present invention includes a pair of parallel, spaced-apart guide bars 30 and 31 mounted on the inside of the drill tower 10 and spaced from the leg 11 of the drill tower. The bars 30 and 31 are interconnected by a plurality of spaced-apart U-shaped bracket members 32. Each of the brackets 32 includes a pair of legs 33 and 34 connected by a base member 35. The leg 34 extends across the entire back of the drill tower 10. The guide bars 30 and 31 are spaced apart a distance sufficient to permit the loop 29 of the flexible hoses 28 fit between the bars 30 and 31. The bars 30 and 31 extend about halfway up the tower 4 and are interconnected at 36. When the head 20 is in its uppermost position, shown in FIG. 2, the loop 29 is near the top of the bars 30 and 31.

As the rotary head moves up and down the drill tower, the loop 29 will roll up and down the tower between the guide bars 30 and 31 with the stacked arrangement of the individual loops being maintained. The guide bars maintain the desired vertical alignment of the hoses and prevent the hoses from interfering with the rotary head's vertical movement. In the event the drilling machine is used for angle drilling, the hoses will not get in the way of the rotary head. The guide is placed far enough towards the back of the drill tower to permit adequate clearance between the movable rotary head 20 and the guide. The elongated legs 34 of the U-shaped member 32 ensure that the hose will not come out of the tower during angle drilling.

Although the guide has been illustrated as a pair of interconnected vertical bars, other guide arrangements are considered to be within the scope of the present invention. If desired, the flexible hoses could be retained in their vertically aligned position by a trough made of sheet metal or the vertical bars 30 and 31 could be eliminated by a closely spaced network of U-shaped brackets similar to the brackets 32.

It should be apparent from the foregoing that the objects of this invention have been carried out. The guide is of simple design and not subject to mechanical failure such as may be encountered with prior hose reelers. The guide is located within the tower so that in the event of hose rupture, the operator is protected by the drill tower. Excess space is not taken up by the hose guide because it is positioned within the tower. The hose guide is effective regardless of the number of hoses used by the machine.

I claim:

1. In combination, a rock-drilling machine including a drill tower, a rotary head movably mounted on said drill tower, a control panel, a plurality of substantially rigid pipes mounted on said tower and a plurality of flexible hoses aligned in a plane parallel to the longitudinal axis of said tower and each connected at one end to one of said pipes and at its other end to said rotary head for conducting fluid under pressure between said control panel and said rotary head whereby a loop is formed in each of said hoses between the point said hoses are connected to said pipes and the point said hoses are connected to said rotary head and said loop rolls along said tower in said plane as said rotary head moves along said tower, and guide means including means positioned on opposite sides of said loop for maintaining the alignment of said hoses.

2. The combination of claim 1 wherein said drill tower is a generally C-shaped structure and said hoses are positioned within the tower.

3. The combination of claim 2 wherein said means positioned on opposite sides of said loop is a pair of parallel, spaced-apart guide bars mounted within said tower.

4. The combination of claim 3 wherein said guide means further includes a plurality of U-shaped brackets interconnecting said guide bars, one leg of each of said brackets being connected to one of said guide bars.

5. In combination, a machine having a consumer of fluid under pressure movably mounted on support structure and at least one flexible hose for supplying fluid under pressure to said consumer, and apparatus for guiding the movement of said hose comprising:

a pair of substantially parallel, spaced-apart guide bars mounted on one consumer support structure parallel to the path of movement of the consumer; and a plurality of spaced-apart U-shaped brackets, one leg of each of said brackets being connected to one of said guide bars.

* * * * *